(12) United States Patent
Son et al.

(10) Patent No.: US 12,572,258 B2
(45) Date of Patent: Mar. 10, 2026

(54) APPARATUS AND METHOD WITH IMAGE PROCESSING USER INTERFACE

(71) Applicant: SAMSUNG ELECTRONICS CO., LTD., Suwon-si (KR)

(72) Inventors: Hyeongseok Son, Suwon-si (KR); Seungin Park, Suwon-si (KR); Byung In Yoo, Suwon-si (KR); Solae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 18/307,238

(22) Filed: Apr. 26, 2023

(65) Prior Publication Data

US 2024/0168604 A1 May 23, 2024

(30) Foreign Application Priority Data

Nov. 22, 2022 (KR) ........................ 10-2022-0157570

(51) Int. Cl.
*G06F 3/0482* (2013.01)
*G06F 3/04847* (2022.01)
*G06T 7/11* (2017.01)
*G06T 7/33* (2017.01)

(52) U.S. Cl.
CPC ........ *G06F 3/0482* (2013.01); *G06F 3/04847* (2013.01); *G06T 7/11* (2017.01); *G06T 7/337* (2017.01); *G06T 2200/24* (2013.01)

(58) Field of Classification Search
CPC ............... G06F 3/0482; G06F 3/04847; G06F 3/04817; G06F 2203/04806; G06F 3/04845; G06F 3/04842; G06T 7/11; G06T 7/337; G06T 2200/24; H04N 23/62; H04N 23/69; H04N 23/70; H04N 23/84; H04N 23/959; G06V 40/10
See application file for complete search history.

(56) References Cited

U.S. PATENT DOCUMENTS

| | | | | |
|---|---|---|---|---|
| 8,954,887 | B1 * | 2/2015 | Tseng | ................ G06F 3/04812 |
| | | | | 715/823 |
| 2008/0118151 | A1 * | 5/2008 | Bouguet | ............ G06F 16/5854 |
| | | | | 382/181 |

(Continued)

FOREIGN PATENT DOCUMENTS

| | | |
|---|---|---|
| KR | 10-2013-0088493 A | 8/2013 |
| KR | 10-2018-0052002 A | 5/2018 |

(Continued)

*Primary Examiner* — William A Beutel

(74) *Attorney, Agent, or Firm* — NSIP Law

(57) ABSTRACT

An apparatus and method for processing an image are provided. The apparatus includes: one or more processors; memory storing instructions configured to, when executed by the one or more processors, cause the one or more processors to: detect objects in the image; determine region of interest (ROI) scores of the respective detected objects; determine whether to display icons for the respective objects based on the respective ROI scores; display an image processing user interface including at least a portion of the image and the icons; and receive an input selecting an icon from among the icons displayed with the user interface, and in response perform image processing based on the selected icon.

20 Claims, 11 Drawing Sheets

(56) References Cited

U.S. PATENT DOCUMENTS

| | | | | |
|---|---|---|---|---|
| 2013/0239057 A1* | 9/2013 | Ubillos | ............... | G06F 3/04842 |
| | | | | 715/833 |
| 2018/0069983 A1* | 3/2018 | Cho | ..................... | H04N 23/632 |
| 2018/0376121 A1* | 12/2018 | Wang | .................... | G06F 3/0485 |
| 2020/0019784 A1* | 1/2020 | Sun | ........................ | G06V 20/30 |
| 2020/0329193 A1 | 10/2020 | Selig et al. | | |
| 2023/0082197 A1* | 3/2023 | Chandrasekhar | .. | H04N 21/4622 |
| | | | | 725/40 |

FOREIGN PATENT DOCUMENTS

| | | | |
|---|---|---|---|
| KR | 10-2066857 B1 | 1/2020 | |
| KR | 10-2369588 B1 | 3/2022 | |

* cited by examiner

410

APPARATUS AND METHOD WITH IMAGE PROCESSING USER INTERFACE

CROSS-REFERENCE TO RELATED APPLICATIONS

This application claims the benefit under 35 USC § 119(a) of Korean Patent Application No. 10-2022-0157570, filed on Nov. 22, 2022, in the Korean Intellectual Property Office, the entire disclosure of which is incorporated herein by reference for all purposes.

BACKGROUND

1. Field

The following description relates to an apparatus and method with an image processing user interface.

2. Description of Related Art

Technology for controlling a zoom, focus, or exposure of a camera may involve processing by pinching (e.g., zoom adjustment) or touching (e.g., focus or exposure adjustment) a desired pixel area by placing a finger on the desired pixel area of a user interface displayed on a display.

Auto-zoom for cameras has been performed by selecting at least one object through a user interface such as by receiving a touch input associated with an object displayed on a display, drawing a circle around the object, etc., and then tracking the selected object to facilitate auto-zoom on the selected object.

According to Fitts' Law, the time needed to move a selector (e.g., a digit) to a target user interface selection/input area is a function of the ratio between the distance to the target and the width of the target. According to Fitts' Law, image processing user interfaces have had inefficient usability because an interaction area is an entire display. That is, a user may need to move over the entire display (user interface) to provide inputs for tasks such as selecting an object for image processing. Since a moving object or the position of an object continuously changes when video is being shot by a camera, this conventional interaction/selection approach is suboptimal when selecting an object by considering all shooting areas as potential input areas. In addition, when displayed objects overlap, it is difficult to select a desired overlapped (partially obscured) object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for processing an image includes: one or more processors; memory storing instructions configured to, when executed by the one or more processors, cause the one or more processors to: detect objects in the image; determine region of interest (ROI) scores of the respective detected objects; determine whether to display icons for the respective objects based on the respective ROI scores; display an image processing user interface including at least a portion of the image and the icons; and receive an input selecting an icon from among the icons displayed with the user interface, and in response perform image processing based on the selected icon.

The instructions may be further configured to cause the one or more processors to calculate the ROI scores based on types and sizes of the respective objects.

The instructions may be further configured to cause the one or more processors to calculate the ROI scores based on a user preference associated with the objects.

The instructions may be further configured to cause the one or more processors to calculate the ROI scores based on threshold values and weights corresponding to the types and the sizes of the objects or whether to tag the plurality of objects.

The instructions may be further configured to cause the one or more processors to: select a target objects from among the detected objects, wherein the target objects are selected based on having respective ROI scores that satisfy a score condition; and align the target objects based on their respective ROI scores.

The instructions may be further configured to cause the one or more processors to: generate the icons based on features of the target objects; and display the icons in an order that is based on the ROI scores.

The instructions may be further configured to cause the one or more processors to display the icons at respective points that are less than or equal to a predetermined distance from an outer boundary of a display configured to display the user interface.

The instructions may be further configured to cause the one or more processors to, in response to a selection of one of the icons, display a zoom control, a depth of focus control, a brightness control, or a color control in response to a selection of the plurality of icons.

The instructions may be further configured to cause the one or more processors to display a slide bar control configured to adjust an intensity of the image processing.

The instructions may be further configured to cause the one or more processors to determine whether to display the slide bar interface based on a duration of an input to the user interface.

In another general aspect, a method of processing an image includes: detecting objects in an image; determining whether to display user interface elements respectively corresponding to the detected objects based on region of interest (ROI) scores respectively corresponding to the detected objects; displaying an image processing user interface including user interface elements of the respective detected objects determined to be displayed based on their respectively corresponding ROI scores; and performing image processing in response to an input received by the image processing user interface.

The ROI scores may be computed based on types and sizes of the detected objects.

The ROI scores may be computed based on a user preference for the detected objects.

The ROI scores may be computed based on threshold values and weights corresponding to the types and the sizes.

The determining of whether to display the user interface elements may include: selecting, from among the detected objects, target objects having respective ROI scores greater a score threshold; and aligning the user interface elements in the image processing user interface based on their respective ROI scores.

The displaying of the image processing user interface may include: generating the user interface elements based on features of the respectively corresponding target objects; and displaying the user interface elements in an order is based on the ROI scores of the corresponding target objects.

The displaying of the image processing user interface may include displaying the user interface elements at less than a predetermined distance from an outer boundary of the display.

The method may further include displaying a zoom control, a depth of focus control, a brightness control, or a color control in response to an input to the image processing user interface that selects one of the user interface elements.

The method may further include displaying a slide bar interface configured to adjust an intensity of the image processing in response to an input to the image processing user interface.

The method may further include determining whether to display the slide bar interface based on a duration of the input.

Other features and aspects will be apparent from the following detailed description, the drawings, and the claims.

Figure 1:
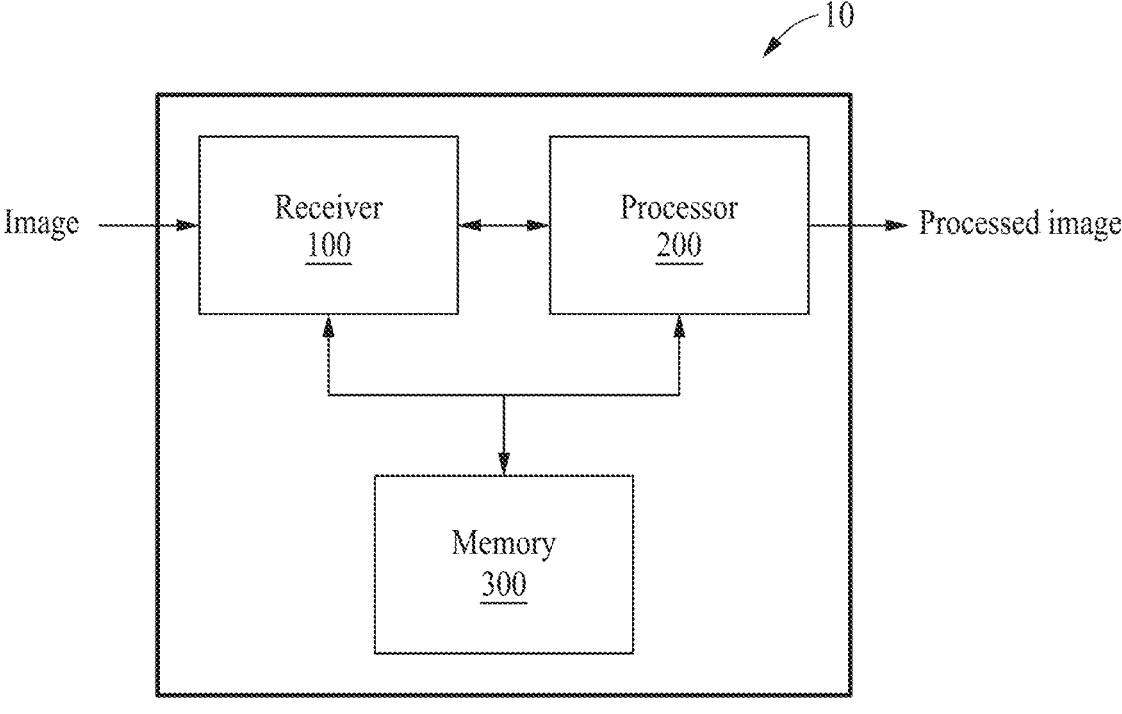
FIG. 1 illustrates an example image processing apparatus, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example image processing apparatus 10, according to one or more embodiments. The image processing apparatus 10 may generate an image. The image includes image data of one or more objects object. The image data of an object may be pixels of lines, color regions, etc. that represent a shape of the object. The image may be in a form to be processed by a computer.

The image processing apparatus 10 may generate a processed image by performing an image processing function a captured image. The image processing function may be selected by a user input. The captured image may be captured by a capturing device (e.g., a camera). The image processing apparatus 10 may be implemented inside or outside the capturing device.

The image processing apparatus 10 may be, or may be included in, a personal computer (PC), a data server, a portable device, a standalone camera, or the like.

The portable device may be, for example, a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal or portable navigation device (PND), a handheld game console, an e-book, or a smart device. The smart device may be implemented as, for example, a smartwatch, a smart band, or a smart ring.

The image processing apparatus 10 may include a receiver 100 and a processor 200. The image processing apparatus 10 may further include a memory 300.

The receiver 100 may receive an image from an image sensor. The image sensor may include an integrated circuit including an optoelectronic conversion element. The receiver 100 may include a receiving interface. The receiver 100 may output the received image to the processor 200.

The processor 200 may process data stored in the memory 300. The processor 200 may execute computer-readable code (e.g., software in the form of instructions) stored in the memory 300 and instructions triggered by the processor 200.

The processor 200 may be a hardware-implemented data processing device having a circuit that is physically structured to execute desired operations. The desired operations may include, for example, code or instructions in a program.

For example, the hardware-implemented data processing device may include a microprocessor, a central processing unit (CPU), a processor core, a multi-core processor, a multiprocessor, an application-specific integrated circuit (ASIC), a field-programmable gate array (FPGA), a digital signal processor (DSP).

The processor 200 may perform any of various object detection algorithms to detect objects in the received image, for example machine learning models trained for object detection/recognition (e.g., a convolutional neural network), traditional pipeline-based object detection, etc. The objects may have various features that define a shape or attributes detectable by an object detection algorithm. A detected object may correspond to animate or inanimate object. For example, an object may correspond to a person, an animal, or any of various physical objects. Any known object detection and/or recognition algorithms may be used to detect any objects (and possibly recognize their types) in the received image.

The processor 200 may determine whether to display representations of (or user interface elements for) any detected objects based on region of interest (ROI) scores respectively corresponding to the detected objects. "Region of interest" refers to a region of the image, generally corresponding to a detected object, and a score is a measure of interest in (or importance of) the region according to various objective criteria described below. The processor 200 may calculate a ROI score for a detected object based on a type and size of the detected objects and/or based on a determination of whether to tag the detected objects. The processor 200 may calculate the ROI score based on threshold values and weights corresponding to the type and the size and/or based on whether the detected objects have been tagged in some way.

The processor 200 may calculate the ROI score based on a user preference for the detected objects (e.g., some stored user-preference information that may be associated with an object by its type, identity, etc.).

The processor 200 may select, as target objects, detected objects having respective ROI scores that are greater than a threshold score. The processor 200 may align (order) user interface elements for the respective target objects based on their respective ROI scores.

The processor 200 may display an image processing user interface having icons (or other user interface elements) respectively corresponding to the target objects.

The processor 200 may generate icons (or user interface elements) based on features of the target objects. The processor 200 may display the icons in an order that is based on the corresponding ROI scores.

The processor 200 may display the icons within a predetermined distance from an outer boundary of the display (e.g., within a perimeter region of the display).

The processor 200 may display a zoom control, a depth of focus control, a brightness control, and/or a color control in response to a user-input (e.g. touch) selection of one the icons (or user interface elements).

The processor 200 may display a slide bar interface to adjust an intensity of image processing in response to an input of the image processing user interface. The processor 200 may determine whether to provide the slide bar interface based on a duration of the input.

The processor 200 may perform the image processing in response to the input to the image processing user interface.

The memory 300 may store data for an operation or an operation result. The memory 300 may store instructions (or programs) executable by the processor 200. For example, the instructions may include instructions for executing an operation of the processor 200 and/or instructions for performing an operation of each component of the processor 200.

The memory 300 may be implemented as a volatile memory device or a non-volatile memory device.

The volatile memory device may be a dynamic random-access memory (DRAM), static random-access memory (SRAM), thyristor RAM (T-RAM), zero capacitor RAM (Z-RAM), or twin transistor RAM (TTRAM).

The non-volatile memory device may be an electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, or insulator resistance change memory.

Figure 2:
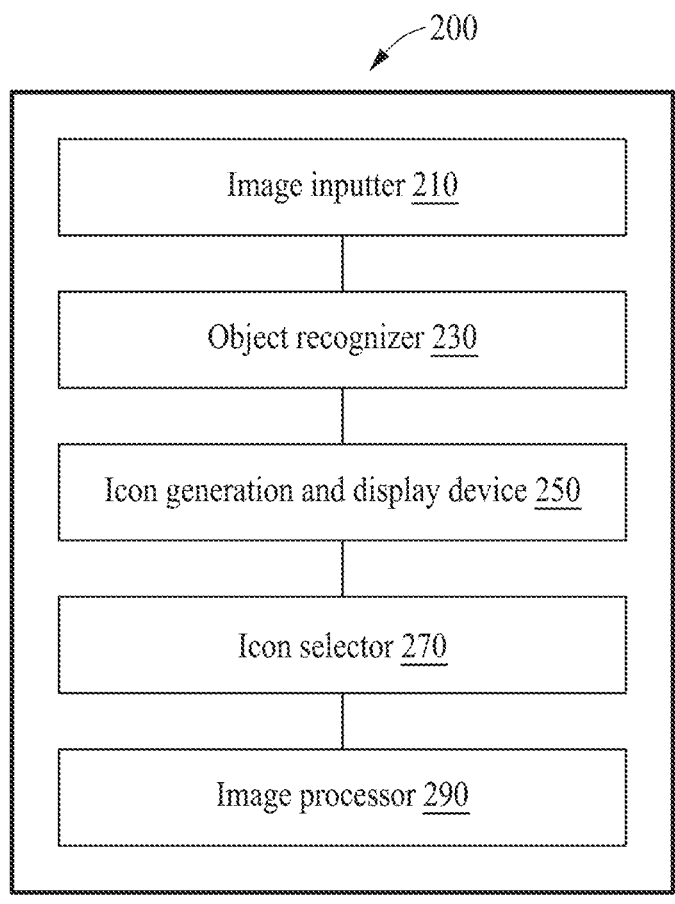
FIG. 2 illustrates an example processor, according to one or more embodiments.

FIG. 2 illustrates an example of the processor 200 of FIG. 1, according to one or more embodiments. The processor 200 may provide the image processing user interface in real time (e.g., in a "live" mode) when in a mode for taking pictures and/or videos. The user interface may enable convenient selection of an object to which image processing functions such as zoom control, depth of focus control (or focus control), brightness control and/or color control, or the like, are applied to (or are based upon).

The processor 200 may automatically detect the object to which an image processing effect is to be applied (or is to be based upon) and display the icon or user interface element to the object on the display in a form that may be interacted with by user input, and may do so automatically, i.e., without requiring an operation of directly touching a pixel area of the object to be interacted with in an image displayed on the display. The processor 200 may automatically detect the object and display the interactive user interface element associated with the object on the display, so that a user of the capturing device may easily select from among multiple (possibly widely dispersed) objects through an interaction in a small area (relative to the size of the image).

The processor 200 may provide each of the detected objects with icons, for example, and dispose the icons on a boundary part of the display (e.g., a perimeter region of the display), so that a user may select a desired object by touching the corresponding icon on the boundary and thus perform the interaction. By providing the icons on the boundary region of the display, a user may be able to grip the capturing device and select the object with one hand using a same finger of the hand holding the capturing device.

The processor 200 may facilitate capturing of an image without shaking by providing a user interface that allows a user to select an object without having to take the other hand off of the capturing device when stabilizing the capturing device with both hands.

The processor 200 may improve the quantitative usability according to Fitts' Law by limiting the interaction area (e.g., where the icons are displayed) to a boundary portion of the display.

Fitts' Law describes a basic law of a relationship between the speed and accuracy of human actions in the field of human-computer interaction. The time taken to touch or click a an area distant from an input implement (e.g., a finger) may vary depending on the distance to an area to be manipulated and the width (size) of the area. As the area to be manipulated gets further away from a current position of a finger, for example, and a distant button to be selected gets smaller, it may take more time to manipulate the area/button. Fitts' Law may be represented as Equation 1.

$$T = a + b\log_2\left(\frac{D}{W} + 1\right) \qquad \text{Equation 1}$$

Here, T denotes the time required for manipulation, D denotes a distance to a target to be manipulated, and W denotes the width of the area to be manipulated.

The processor 200 may provide a user interface that may enable control or activation of an image processing function without manipulating with both hands the capturing device equipped with a touch display. The processor 200 may effectively enable such an interaction even when the display is large compared to the hands of users, because the fingers of the user remain close to the input area (the perimeter area where interactive icons are displayed).

The processor 200 may perform the image processing in real time while capturing an image using the camera. The processor 200 may also provide object selection and the image processing function when in a mode for editing an already captured image or video.

The processor 200 may include an image inputter 210, an object recognizer 230, an icon generation and display device 250, an icon selector 270, and an image processor 290.

The image inputter 210 may receive the image from the receiver (e.g., the receiver 100 of FIG. 1) or the image sensor. The image inputter 210 may receive an image taken as a live stream when taking a photo or video.

The object recognizer 230 may calculate the ROI score of a detected object based on a type, size, and/or salience (feature) of the object in the image. The object recognizer 230 may identify semantic information from the input image using the object detection algorithm. For example, the object recognizer 230 may perform object recognition. The object recognizer 230 may operate periodically based on a predetermined period.

The object recognizer 230 may calculate the ROI score using a feature of the object that may be determined using available computer vision technology. The object recognizer 230 may identify the type and/or size of the object based on the detected object. The object recognizer 230 may assign an additional score to the tagged object using saliency or prominence detection. Note that although object detection is described in places, where context indicates, this may also encompass object recognition, although embodiments may be implemented with object detection but not object recognition (e.g., by using the size of a detected object for computing its ROI score).

The object recognizer 230 may calculate the ROI score by computing a weighted combination of the type, size, and/or salience of the object. The object recognizer 230 may calculate the ROI score in a form of a weighted summation using attribute scores (e.g., a score corresponding to the type of the object, a score corresponding to the size of the object, and/or a score corresponding to whether to tag the object).

The object recognizer 230 may calculate the ROI score with a value obtained by multiplying and adding each attribute score to the weight. For example, the object recognizer 230 may assign a high weight to the object when the object is a person or an animal. The object recognizer 230 may assign a higher weight to the object as the size of the object increases. The object recognizer 230 may assign a higher weight to the object as the saliency score increases. In other words, the various attributes of an object may determine respective scores/weights that are then added.

The object recognizer 230 may determine a threshold value of each attribute score and adjust the object of a predetermined level or higher not to be displayed on the screen ("displaying an object" and similar phrases used herein are a shorthand reference to displaying a user interface element associated with an object).

The icon generation and display device 250 may classify (or select) objects that may be enabled to be interacted with by a user (e.g., target objects) based on the calculated ROI scores. The icon generation and display device 250 may store a list of such selected target objects and manage the list as a data structure.

To increase visibility, the icon generation and display device 250 may display the user interface elements or icons of some objects in a form of large icons in an order of high interest (e.g., the ROI score) on the boundary part of the display screen.

To improve visibility of an icon of an object, the icon generation and display device 250 may display a feature part of the object to help distinguish the icon as representing the object (e.g., a thumbnail icon). In some examples, a predefined graphic may be selected for an object's icon (e.g., a graphic representing the type of the object).

The icon generation and display device 250 may generate the icon based on the feature of the object and display the icon in the form of the thumbnail. The icon generation and display device 250 may improve intuitive interaction by displaying a part (e.g., the face of a person and animal) that represents objects well as the thumbnail.

For objects other than people or animals, the icon generation and display device 250 may generate the icon by thumbnailing the entire appearance of the objects. For objects larger than a predetermined size, an area having the highest attention inside of the object may be generated as the thumbnail. The icon may be generated by thumbnailing a designated area according to the type of the object.

The icon selector 270 may perform a selection of the object in response to the interaction such as a touch on the object icon or user interface element located on the boundary part of the display so that a user may easily select the object. The icon selector 270 may select the object through an interaction such as a touch input on the icon of the desired object among the object icons located on the boundary of the display screen. The icon selector 270 may allow visual identification of the selected object by adjusting the transparency of the icon in response to the selection of the object/icon. The icon selector 270 may perform a deselection when the selected object icon is touched again.

The icon selector 270 may select the objects. Through the selection operation described above, the icon selector 270 may provide a user interface that a user may manipulate with one hand that may remain in a position of grasping the device.

The image processor 290 may perform the image processing function (e.g., zoom control, depth of focus control, exposure control, brightness control, and/or color control) based on object information selected by the icon selector 270.

The image processor 290 may provide the image processing user interface and an image adjustment interface for the image processing. The image processor 290 may perform software zoom, out focusing, and exposure control, for example.

The image processor 290 may provide any image processing function that can be associated with the selection of an object, for example, color filtering on the selected objector adjusting a background color to suit the selected object. A property of the selected object (e.g., an average pixel brightness) may be used for image processing other than directly processing the selected object (e.g., setting a white balance for the camera/device).

Even while the image processor 290 is operating, the icon generation and display device 250 and the icon selector 270 may be periodically updated. The image processor 290 may provide the interaction with a user through the icon selector 270.

Figure 3:
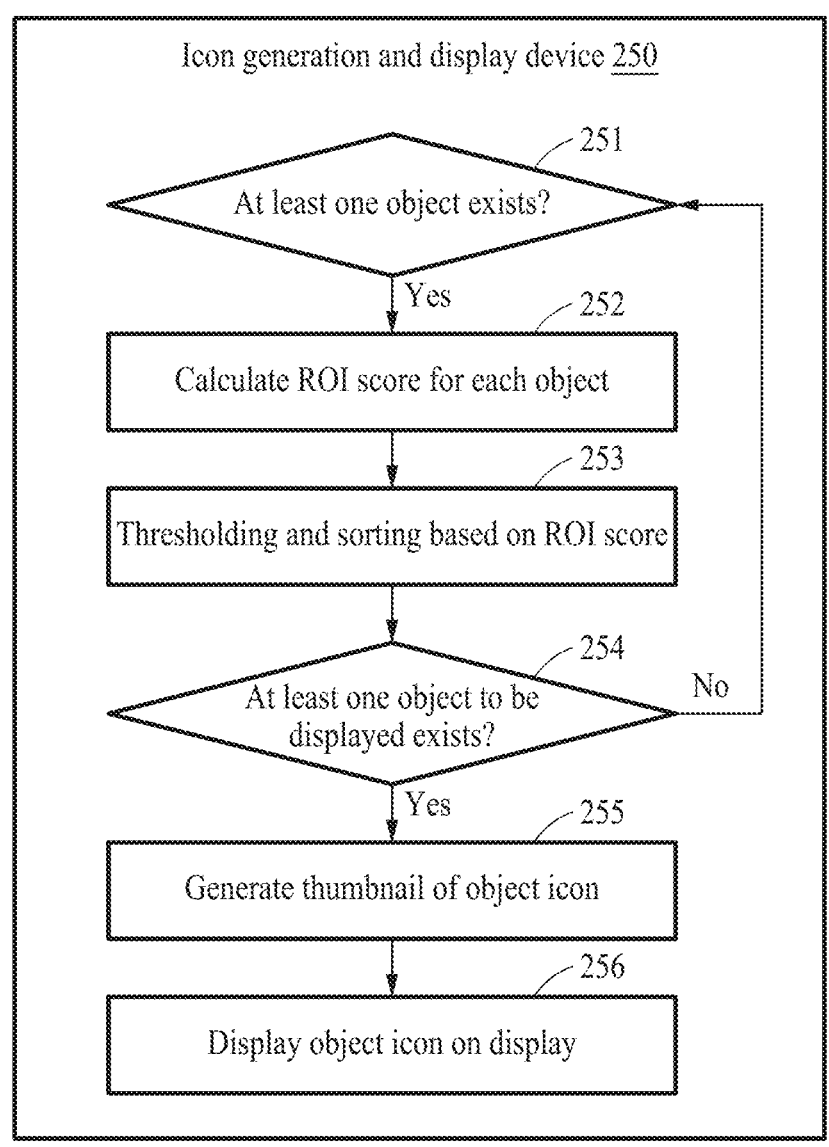
FIG. 3 illustrates an example operation of an icon generation and display device, according to one or more embodiments.

FIG. 3 illustrates an example of icon generation and display.

In operation 251, the icon generation and display device 250 may determine whether at least one object is detected in the image. In operation 252, when at least one object is detected, the icon generation and display device 250 may calculate an ROI score for the object. The icon generation and display device 250 may assign a different ROI score according to the type of the object, for example. The icon generation and display device 250 may calculate the ROI score considering a user preference. For example, a relatively high ROI score may be assigned to the face of a person identified by being stored in a photo album. The same steps may be applied to multiple detected objects.

The icon generation and display device 250 may list and manage preferences or weights for calculating the ROI score. The icon generation and display device 250 may update the list periodically.

In operation 253, the icon generation and display device 250 may perform thresholding and sorting on the object based on the calculated ROI score. The icon generation and display device 250 may sort the objects in the order of high-to-low ROI scores. The icon generation and display device 250 may determine to not display icons or user interface elements for objects having ROI scores less than or equal to a predetermined/threshold score.

In operation 254, the icon generation and display device 250 may determine whether there is at least one target object to be displayed based on a threshold and sorting result. When a target object does not exist, the icon generation and display device 250 may perform operation 251 again.

In operation 255, when there is at least one target object, an icon of the object may be generated based on information received from the object recognizer 230.

In operation 256, the icon generation and display device 250 may display the generated icon on the display, for example, at the boundary or perimeter of the display. The icon generation and display device 250 may display the icon within a predetermined distance from the outer boundary of the display.

The icon generation and display device 250 may adjust the size of the icon for visibility. When the displayed space of the display is insufficient, only some of the target objects may be displayed.

To improve visibility, the icon generation and display device 250 may display a part (e.g., the face of a person or animal) that represents features of the object as the icon.

A position of the display (e.g., a left or right perimeter area) where the icon is displayed may be determined according to a user preference. For example, a position where the icon is displayed may be determined according to a preference indicating whether a user is right-handed or left-handed.

The icon generation and display device 250 may effectively reduce the interaction area (the area where user interface elements of the objects may be interacted with) by displaying the object icon on the boundary part of the display screen.

Figure 4:
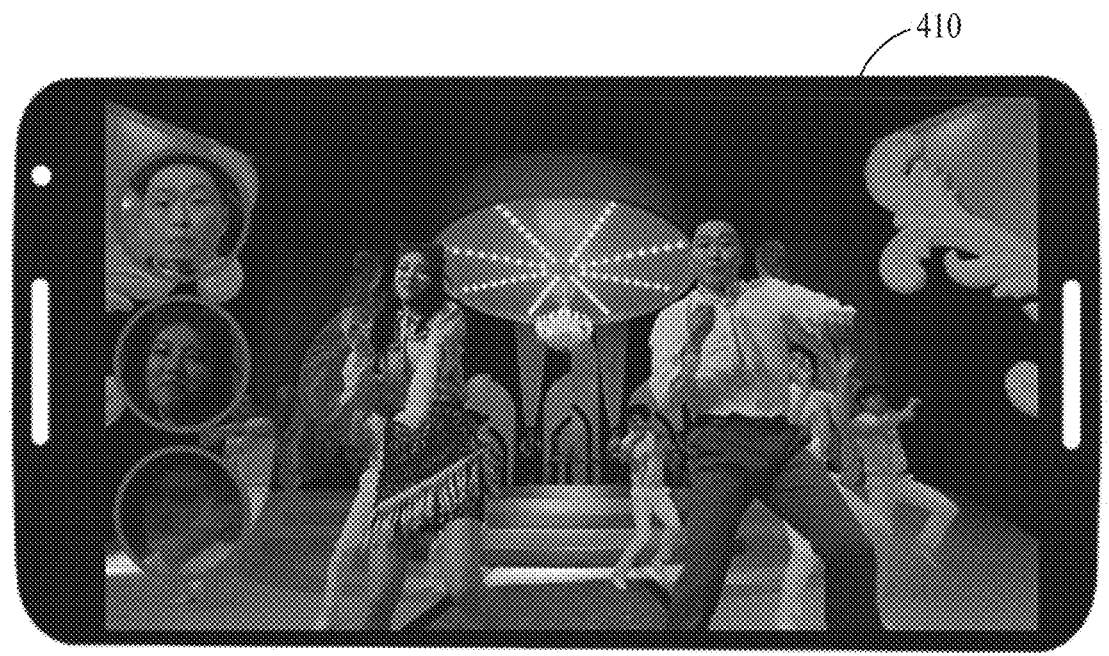
FIG. 4 illustrates an example of icon generation, according to one or more embodiments.
Figure 5:
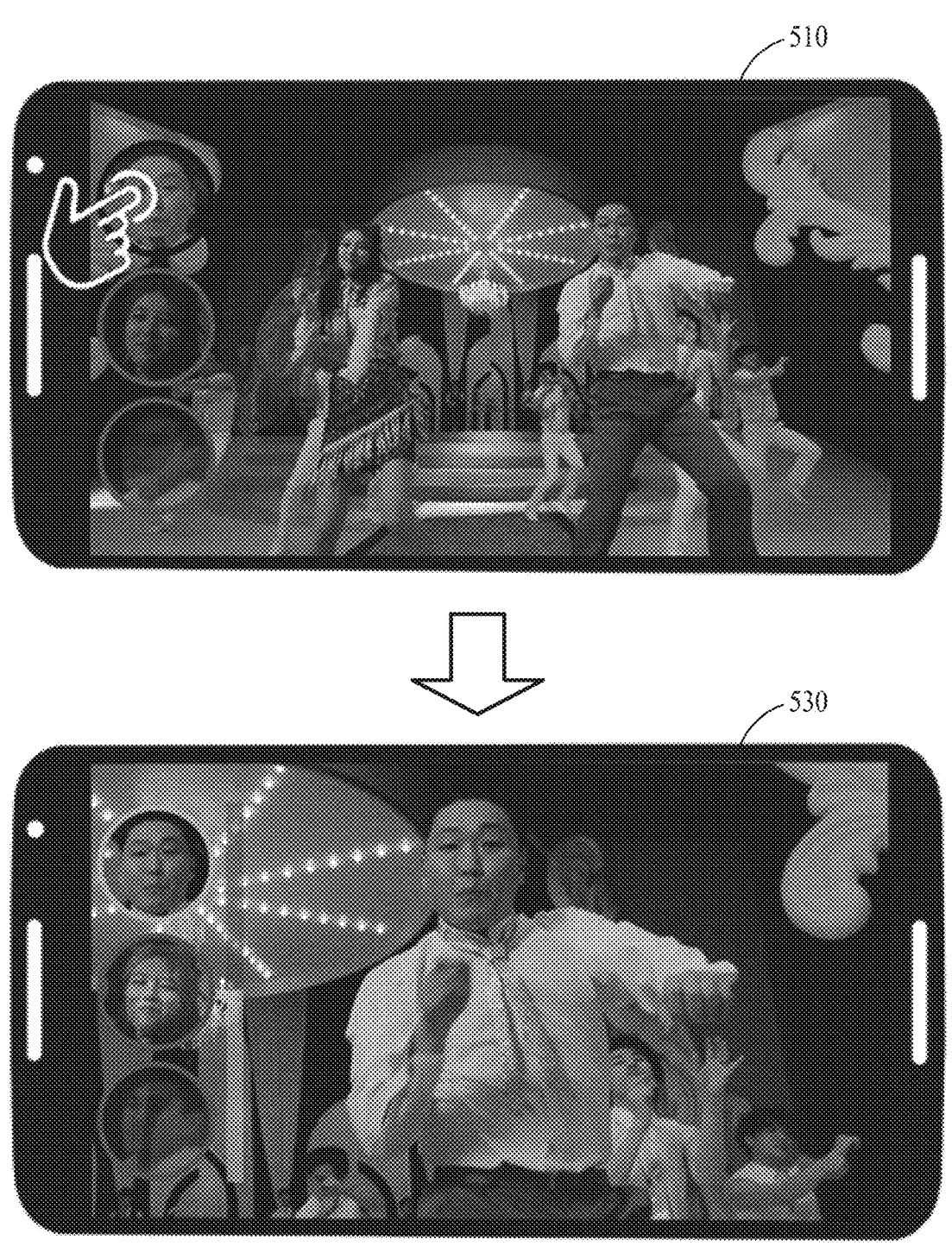
FIG. 5 illustrates an example of icon selection and image processing, according to one or more embodiments.
Figure 6:
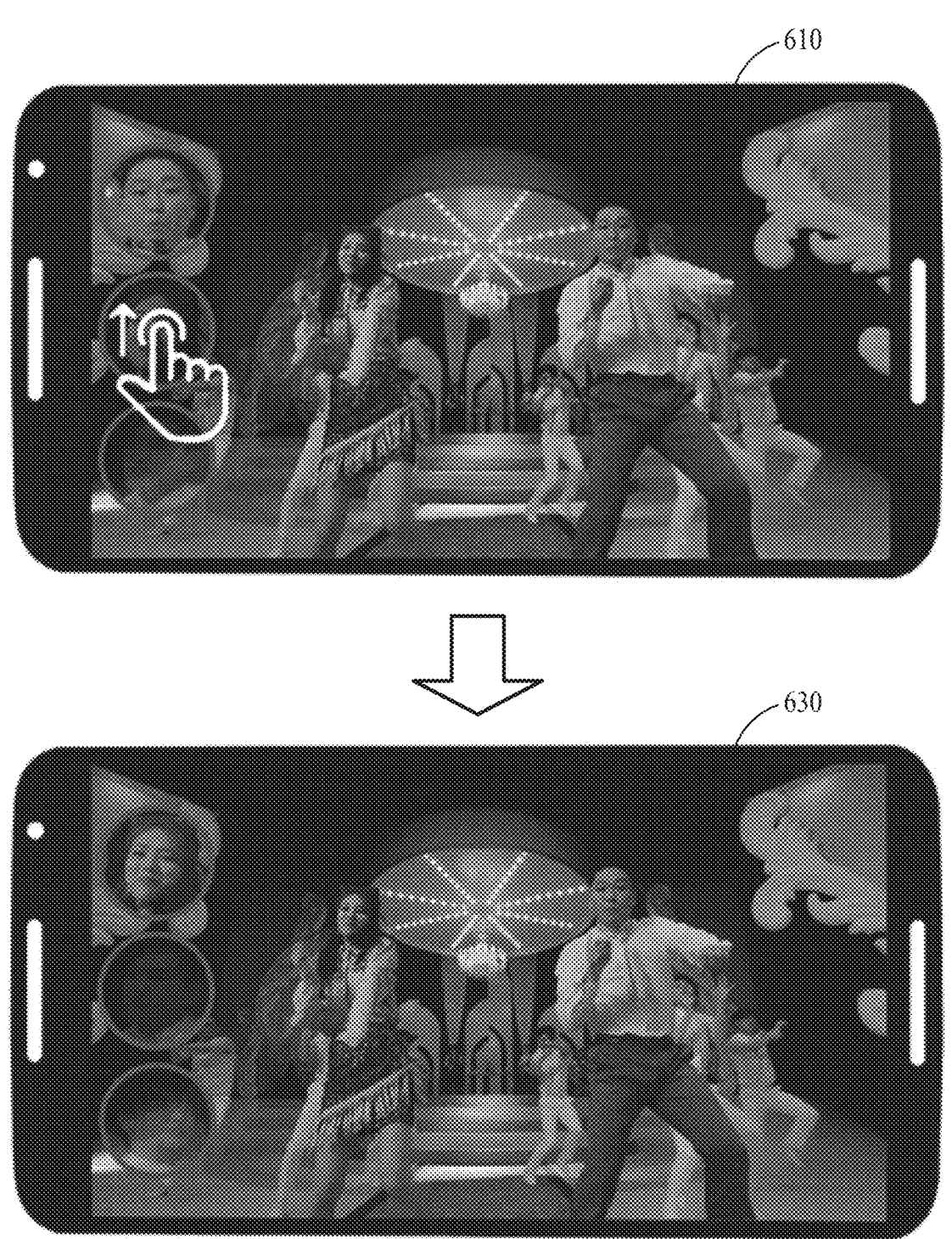
FIG. 6 illustrates an example of icon selection and object search, according to one or more embodiments.
Figure 7:
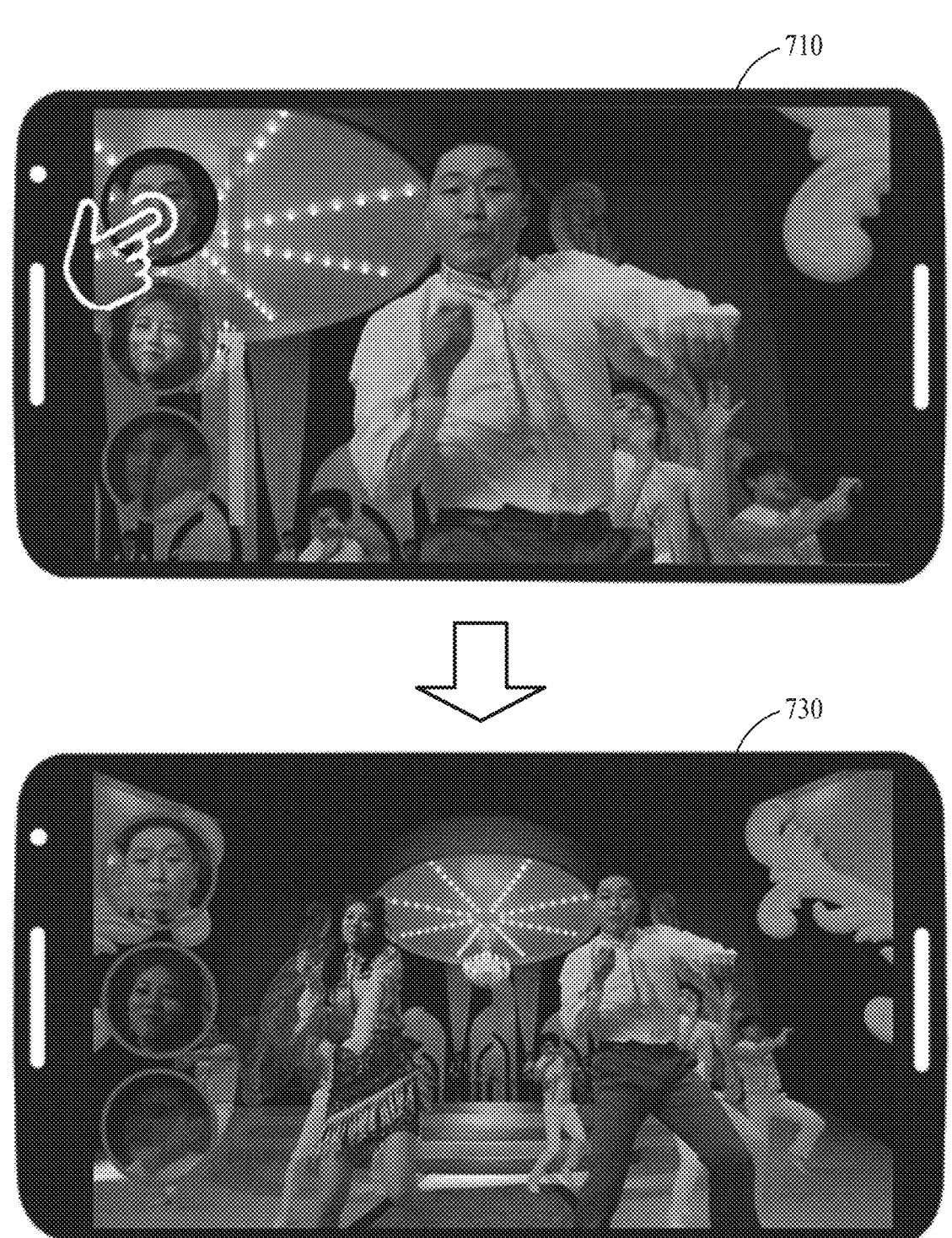
FIG. 7 illustrates an example of icon selection and deselection, according to one or more embodiments.

FIG. 4 illustrates an example of icon generation and FIG. 5 illustrates an example of icon selection and image processing. FIG. 6 illustrates an example of an operation of an icon selection and object search and FIG. 7 illustrates an example of icon selection and deselection.

Referring to FIGS. 4 to 7, the examples of FIGS. 4 to 7 may represent a case in which a user manipulates the capturing device while holding the capturing device with the left hand. A position of the icon may be changed according to the holding hand (which may be sensed or inferred). The processor 200 may move the position of the icon in response to a drag operation of a user.

Figure 8:
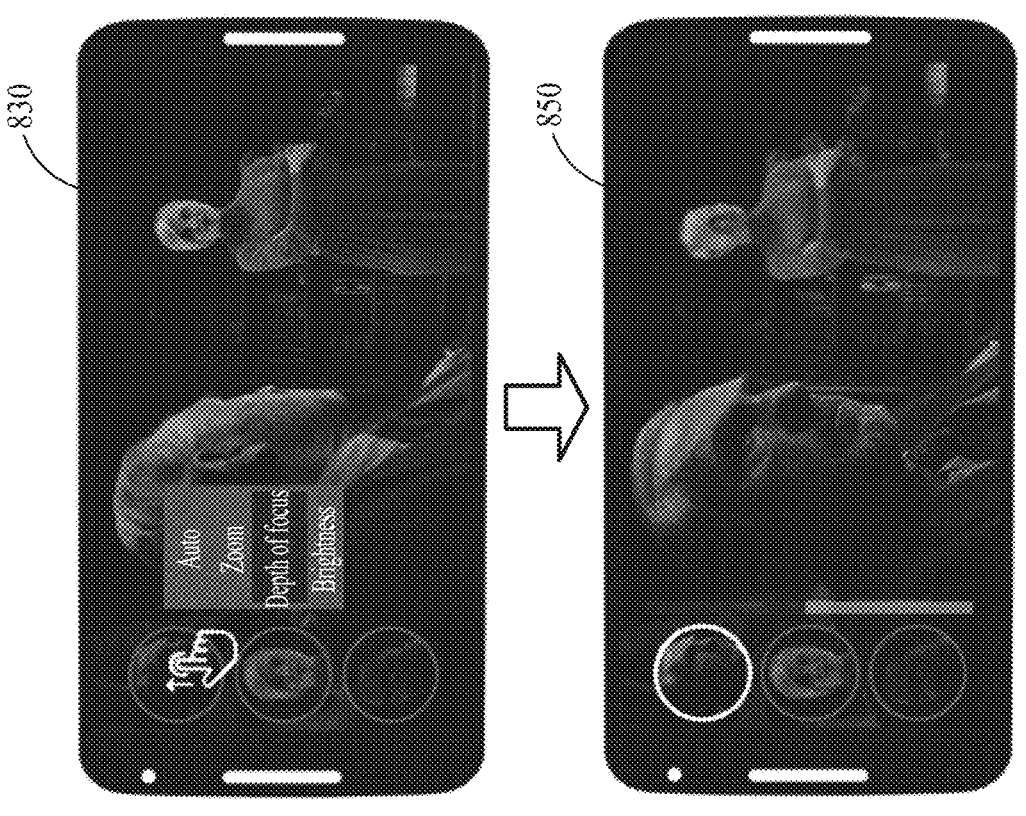
FIG. 8 illustrates an example of an image processing user interface, according to one or more embodiments.
Figure 8:
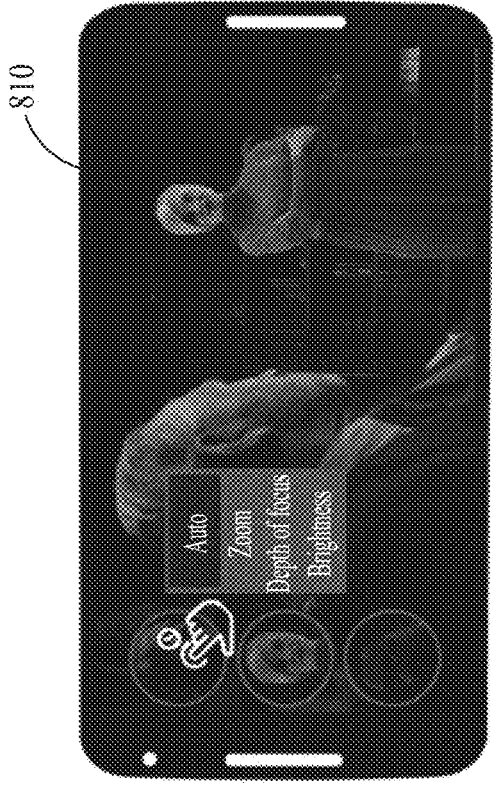

The icon may be disposed on the boundary of the display. In the example of FIG. 8, the icon may be disposed in a position easily accessible with the left fingers. Users may easily access the icon using the thumb of their left hand.

The processor 200 may perform a selection of an object in response to a touch made by one finger and in response display a user interface (or user control) for the image processing function. The processor 200 may perform the image processing function in response to a touch of the image processing user interface (user control).

The processor 200 may enable the selected icon/object to be visually distinguished from a non-selected icon/object by changing the edge color or adjusting the transparency of the selected icon/object.

When all icons may not be displayed on one screen, the processor 200 may provide a sliding/scrolling function for the icons as shown in FIG. 6, so that when a user slides the display with a finger, the list of the icons of the objects may be moved to expose/display icons.

The processor 200 may deselect the icon of the selected object when the icon of the selected object is selected again in a state in which the icon/object is selected. A user may release the image processing function by touching the icon of the object again and return to the original capturing state.

Figure 9:
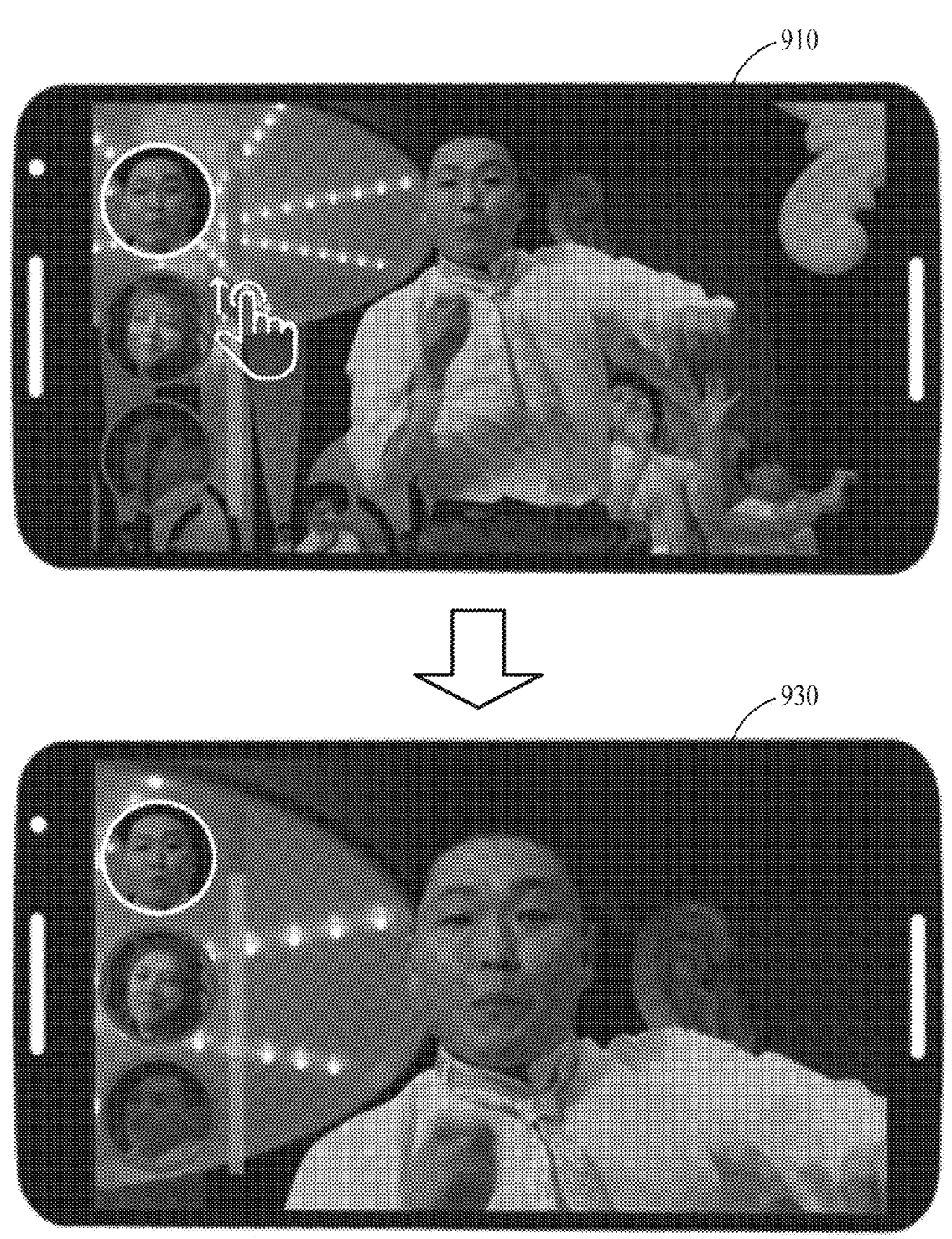
FIG. 9 illustrates an example of increasing an image processing intensity, according to one or more embodiments.
Figure 10:
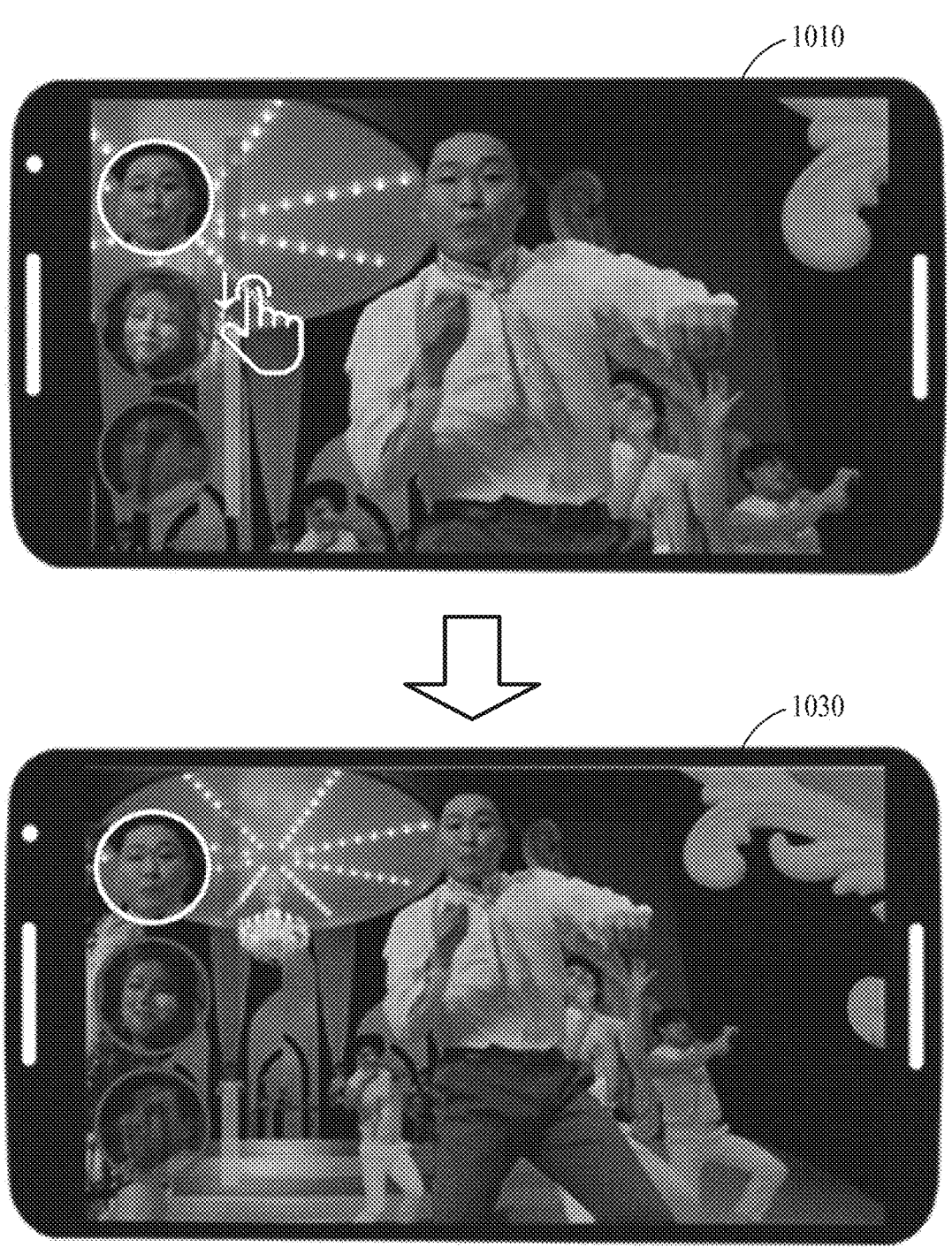
FIG. 10 illustrates an example of lowering an image processing intensity, according to one or more embodiments.

FIG. 8 illustrates an example of an image processing user interface (user control), FIG. 9 illustrates an example of increasing an image processing intensity, and FIG. 10 illustrates an example of lowering an image processing intensity.

Referring to FIGS. 8 and 9, the processor (e.g., the processor 200 of FIG. 1) may display the zoom control interface, the depth of focus control interface, the brightness control interface, and/or the color control interface in response to the selection of one of the icons.

The zoom control may refer to arbitrarily adjusting the size of the object when the object to be captured and the camera are simultaneously fixed (i.e., optical and/or software zoom). The zoom-in may refer to an operation of enlarging or approaching the scene or the object captured by the camera. The zoom-out may refer to an operation of reducing or moving away from the scene or the object captured by the camera.

The depth of focus may refer to a range of distance from the camera in which a captured subject shows an acceptable level of sharpness. The adjustment of the depth of focus may be performed through the adjustment of an aperture value of the camera, a focal length of a lens, and/or a distance to the subject. The processor 200 may provide the same image processing function as when the depth of focus of the camera is adjusted through the depth of focus control interface. In some implementations, an image processing function may be applied directly to an object of a selected icon without displaying (and a user manipulating) a user interface/control for the function.

The processor 200 may provide the slide bar interface to adjust the intensity of the image processing in response to the input of the image processing interface. The processor 200 may determine whether to provide the slide bar interface based on the duration of the input.

The processor 200 may provide the user interface that may provide a plurality of image processing functions through manipulation with one hand. The processor 200 may provide an interface different from a case where the duration is less than or equal to a predetermined time when the input duration (e.g., the duration of a touch on the icon) is greater than or equal to the predetermined time.

The processor 200 may provide a list of the plurality of image processing functions when the pressing time of the icon is longer than the predetermined time. Here, the processor 200 may provide an interface for moving a selection target on the list of image processing functions when a user performs a slide while pressing a finger. When a user touch is removed, the processor 200 may provide an interface for selecting the selection target.

As shown in the example of FIG. 9, the processor 200 may increase or decrease the intensity of the image processing function by providing the slide bar interface. For example, the processor 200 may perform the zoom-in on the object by increasing the zoom control function when a user finger moves the slide bar upward, and on the contrary, perform the zoom-out when the user finger moves the slide bar downward.

Figure 11:
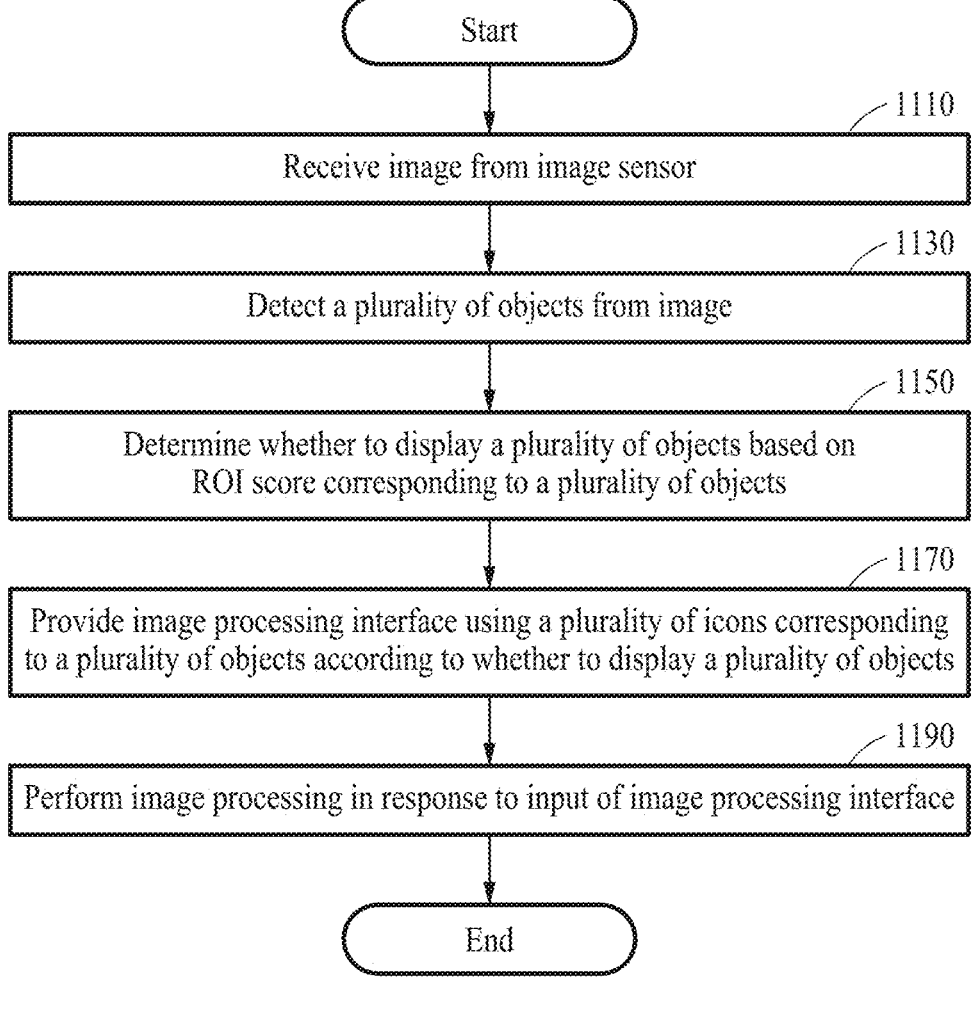
FIG. 11 illustrates an example operation of the image processing apparatus, according to one or more embodiments.

FIG. 11 illustrates an example operation of an image processing apparatus shown in FIG. 1.

Referring to FIG. 11, in operation 1110, the receiver (e.g., the receiver 100 of FIG. 1) may receive an image from the image sensor.

In operation 1130, the processor (e.g., the processor 200 of FIG. 1) may detect and/or recognize objects in the received image.

In operation 1150, the processor 200 may determine whether to display icons of the objects based on the ROI scores respectively corresponding to the objects. The processor 200 may calculate an ROI score based on the type and size of the corresponding object, and/or whether to tag the object. The processor 200 may calculate the ROI score based on threshold values and weights corresponding to the type and the size of the plurality of objects, and/or whether to tag the plurality of objects.

The processor 200 may calculate the ROI score based on a user preference for the plurality of objects.

The processor 200 may select, as target objects, the objects having ROI scores greater than a predetermined score, from among the detected objects. The processor 200 may align the target objects based on the corresponding ROI scores.

In operation 1170, the processor 200 may display the image processing interface using icons corresponding to the respective target objects to be displayed on the display according to whether to display the plurality of objects.

The processor 200 may generate the icons based on features of the target objects. The processor 200 may display the icons in an order that is based on their corresponding object ROI scores.

The processor 200 may display the icons within a predetermined distance from the boundary of the display.

The processor 200 may display or activate the zoom control interface, the depth of focus control interface, the brightness control interface, and/or the color control interface in response to selection of one of the icons.

The processor 200 may display the slide bar interface to adjust the intensity of the image processing in response to the input of the image processing interface. The processor 200 may determine whether to display the slide bar interface based on the duration of the input.

In operation 1190, the processor 200 may perform the image processing in response to the input of the image processing interface.

The computing apparatuses, the electronic devices, the processors, the memories, the image sensors, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An apparatus for processing images in a live video stream being captured by a camera, the apparatus comprising:

one or more processors;

memory storing instructions configured to, when executed by the one or more processors, cause the one or more processors to:

continuously detect objects in the images;

continuously determine region of interest (ROI) scores of the respective detected objects;

continuously determine, based on the ROI scores determined for the respective objects, which of the objects to display icons for, wherein the ROI scores are determined based on types and sizes of the respective objects;

according to the continuous determining of which of the objects to display icons for, continuously update a user interface to display icons of those of the objects that are currently determined based on the ROI scores;

display the continuously updating user interface overlaying a live rendering of the live video stream; and receive a first user input selecting an icon from among the icons currently displayed with the user interface; and responsive to activation, by a second user input, of an image processing operation, perform the image processing operation with respect to whichever of the objects corresponds to the selected icon, wherein the image processing operation comprises a zoom control and a pixel value control comprising a depth of focus control, a brightness control, and a color control.

2. The apparatus of claim 1, wherein the instructions are further configured to cause the one or more processors to calculate the ROI scores based on the types and the sizes of the respective objects.

3. The apparatus of claim 2, wherein the instructions are further configured to cause the one or more processors to calculate the ROI scores based on threshold values and weights corresponding to the types and the sizes of the objects or whether to tag the objects.

4. The apparatus of claim 1, wherein the instructions are further configured to cause the one or more processors to calculate the ROI scores based on a user preference associated with the objects.

5. The apparatus of claim 1, wherein the instructions are further configured to cause the one or more processors to:

determine which of the objects to display icons for based on their respective ROI scores satisfying a score condition; and align the icons of the determined objects based on their respective ROI scores.

6. The apparatus of claim 5, wherein the instructions are further configured to cause the one or more processors to:

generate the icons based on features of the determined objects; and display the icons in an order that is based on the ROI scores.

7. The apparatus of claim 1, wherein the instructions are further configured to cause the one or more processors to display the icons at respective points that are less than or equal to a predetermined distance from an outer boundary of a display configured to display the user interface.

8. The apparatus of claim 1, wherein the instructions are further configured to cause the one or more processors to, in response to the selection of the icon, display a zoom control, a depth of focus control, a brightness control, or a color control.

9. The apparatus of claim 1, wherein the instructions are further configured to cause the one or more processors to display a slide bar control configured to adjust an intensity of the image processing operation.

10. The apparatus of claim 9, wherein the instructions are further configured to cause the one or more processors to determine whether to display the slide bar interface based on a duration of an input to the user interface.

11. A method of processing an image, the method comprising:

continuously detecting objects in images of a live video stream;

continuously selecting from among the detected objects which of the objects to display user interface elements for based on region of interest (ROI) scores respectively determined for the detected objects, wherein the ROI scores are determined based on types and sizes of the respective objects;

continuously updating an image processing user interface to include user interface elements respectively representing whichever of the detected objects are currently selected for the display of user interface elements;

displaying the continuously updating image processing user interface overlaying a rendering of the live video stream; and responsive to receiving an input associated with a user interface element among the displayed user interface elements, performing an image processing operation on which ever of the detected objects corresponds to the user interface element, wherein the image processing operation comprises a zoom control and a pixel value control comprising a depth of focus control, a bright control, and a color control.

12. The method of claim 11, wherein the ROI scores are computed based on the types and the sizes of the detected objects.

13. The method of claim 12, wherein the ROI scores are computed based on threshold values and weights corresponding to the types and the sizes.

14. The method of claim 11, wherein the detected objects are selected based on having respective ROI scores greater than a score threshold, wherein the user interface elements are ordered in the image processing user interface based on their respective ROI scores.

15. The method of claim 11, wherein which of the detected objects are represented by user interface elements changes dynamically according to changes in the ROI scores.

16. The method of claim 11, wherein the displaying of the image processing user interface comprises displaying the user interface elements at less than a predetermined distance from an outer boundary of the display.

17. The method of claim 11, further comprising displaying a zoom control, a depth of focus control, a brightness control, or a color control in response to an input to the image processing user interface that selects one of the user interface elements.

18. The method of claim 11, further comprising displaying a slide bar interface configured to adjust an intensity of the image processing in response to an input to the image processing user interface.

19. The method of claim 18, further comprising determining whether to display the slide bar interface based on a duration of the input.

20. A method performed by a computing device, the method comprising:

performing continuous object recognition on a live video stream to determine scores of respective objects recognized in the live video stream;

continuously updating which of the recognized objects are represented by respective icons in a user interface based on the scores respectively determined for the recognized objects, wherein which recognized objects are represented by icons in the user interface changes dynamically according to changes in the determined scores such that icons are dynamically added to and removed from the user interface according to changes in the live video stream, wherein the determined scores are determined based on types and sizes of the recognized objects;

displaying the user interface with the updating of icons thereof over a rendering of the live video stream; and responsive to selections of the displayed icons, performing operations on the recognized objects respectively corresponding to the selected icons, wherein the operation comprises a zoom control and a pixel value control comprising a depth of focus control, a brightness control, and a color control.

\*　\*　\*　\*　\*